(12) United States Patent
Erbele et al.

(10) Patent No.: US 12,122,023 B2
(45) Date of Patent: Oct. 22, 2024

(54) METHOD FOR DETECTING WORK PROGRESS OF A HANDHELD POWER TOOL

(71) Applicant: Robert Bosch GmbH, Stuttgart (DE)

(72) Inventors: Simon Erbele, Nufringen (DE); Wolfgang Herberger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 236 days.

(21) Appl. No.: 17/631,234

(22) PCT Filed: Jul. 8, 2020

(86) PCT No.: PCT/EP2020/069291
§ 371 (c)(1),
(2) Date: Jan. 28, 2022

(87) PCT Pub. No.: WO2021/018539
PCT Pub. Date: Feb. 4, 2021

(65) Prior Publication Data
US 2022/0258315 A1  Aug. 18, 2022

(30) Foreign Application Priority Data

Jul. 30, 2019 (DE) ..................... 10 2019 211 303.6

(51) Int. Cl.
*B25B 23/147* (2006.01)
*G05B 17/02* (2006.01)

(52) U.S. Cl.
CPC .......... *B25B 23/1475* (2013.01); *G05B 17/02* (2013.01)

(58) Field of Classification Search
CPC ..... G05B 17/02; B25B 23/1475; B25B 21/02; B25B 23/1405; B25B 21/00;
(Continued)

(56) References Cited

U.S. PATENT DOCUMENTS

| 2018/0272511 | A1* | 9/2018 | Sako | B25B 23/1405 |
| 2018/0290270 | A1* | 10/2018 | Manasseh | H02P 6/32 |
| 2020/0246954 | A1* | 8/2020 | Yamada | B25D 17/11 |

FOREIGN PATENT DOCUMENTS

| CN | 105459033 A | 4/2016 |
| DE | 10 2012 001 148 A1 | 8/2012 |

(Continued)

OTHER PUBLICATIONS

International Search Report corresponding to PCT Application No. PCT/EP2020/069291, mailed Nov. 3, 2020 (German and English language document) (7 pages).

*Primary Examiner* — Veronica Martin
(74) *Attorney, Agent, or Firm* — Maginot, Moore & Beck LLP

(57) ABSTRACT

The disclosure relates to a method for detecting work progress of a handheld power tool, the handheld power tool having an electric motor, and the method comprising the steps of: S1 providing at least one model signal form, the model signal form being assignable to the work progress of the handheld power tool; S2 determining a signal of an operating parameter of the electric motor; S3 comparing the signal of the operating parameter with the model signal form and determining a conformity evaluation from the comparison; S4 recognizing the work progress to at least some extent using the conformity evaluation determined in method step S3. Further disclosed is a handheld power tool, more specifically an impact driver, comprising an electric motor and a control unit, the control unit being designed to carry out a method according to the disclosure.

18 Claims, 13 Drawing Sheets

(58) Field of Classification Search
CPC . B25B 21/026; B25B 21/008; B25B 23/1453; B25D 16/006; B25D 2250/201; B25D 2250/221; B25D 11/005; B25D 2250/095; B25D 2250/131
See application file for complete search history.

(56) References Cited

FOREIGN PATENT DOCUMENTS

| | | |
|---|---|---|
| DE | 10 2012 208 902 A1 | 11/2013 |
| DE | 10 2013 212 506 A1 | 12/2014 |
| DE | 10 2015 005 901 A1 | 12/2015 |
| DE | 10 2017 219 477 A1 | 5/2019 |
| EP | 1 136 188 A2 | 9/2001 |
| EP | 2 599 589 B1 | 6/2013 |
| EP | 3 381 615 A1 | 10/2018 |
| EP | 3 501 741 A1 | 6/2019 |
| EP | 3 946 818 | 1/2020 |
| JP | 2001-511073 A | 8/2001 |
| JP | 2010-99765 A | 5/2010 |
| JP | 2015-75821 A | 4/2015 |
| WO | 2017/214194 A1 | 12/2017 |
| WO | 2020/193083 A1 | 10/2020 |

* cited by examiner

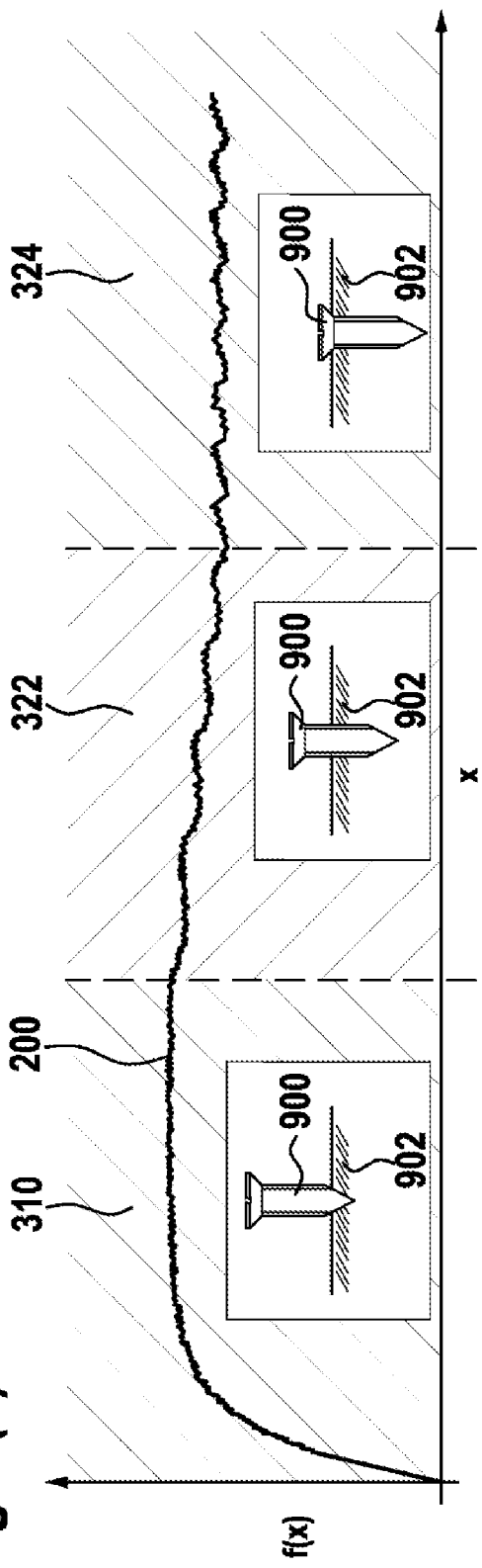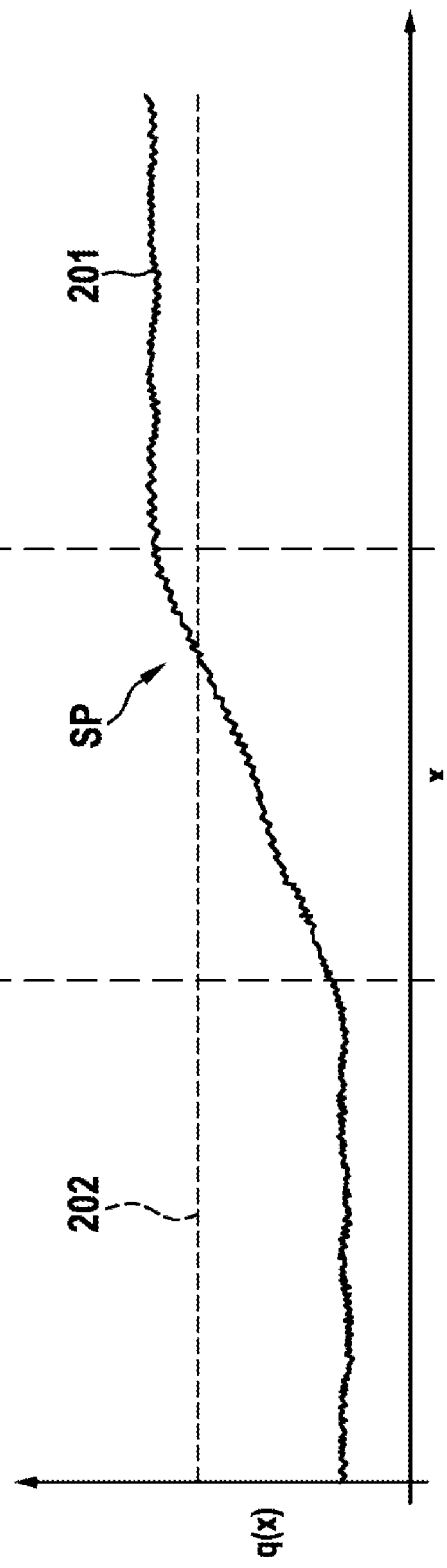

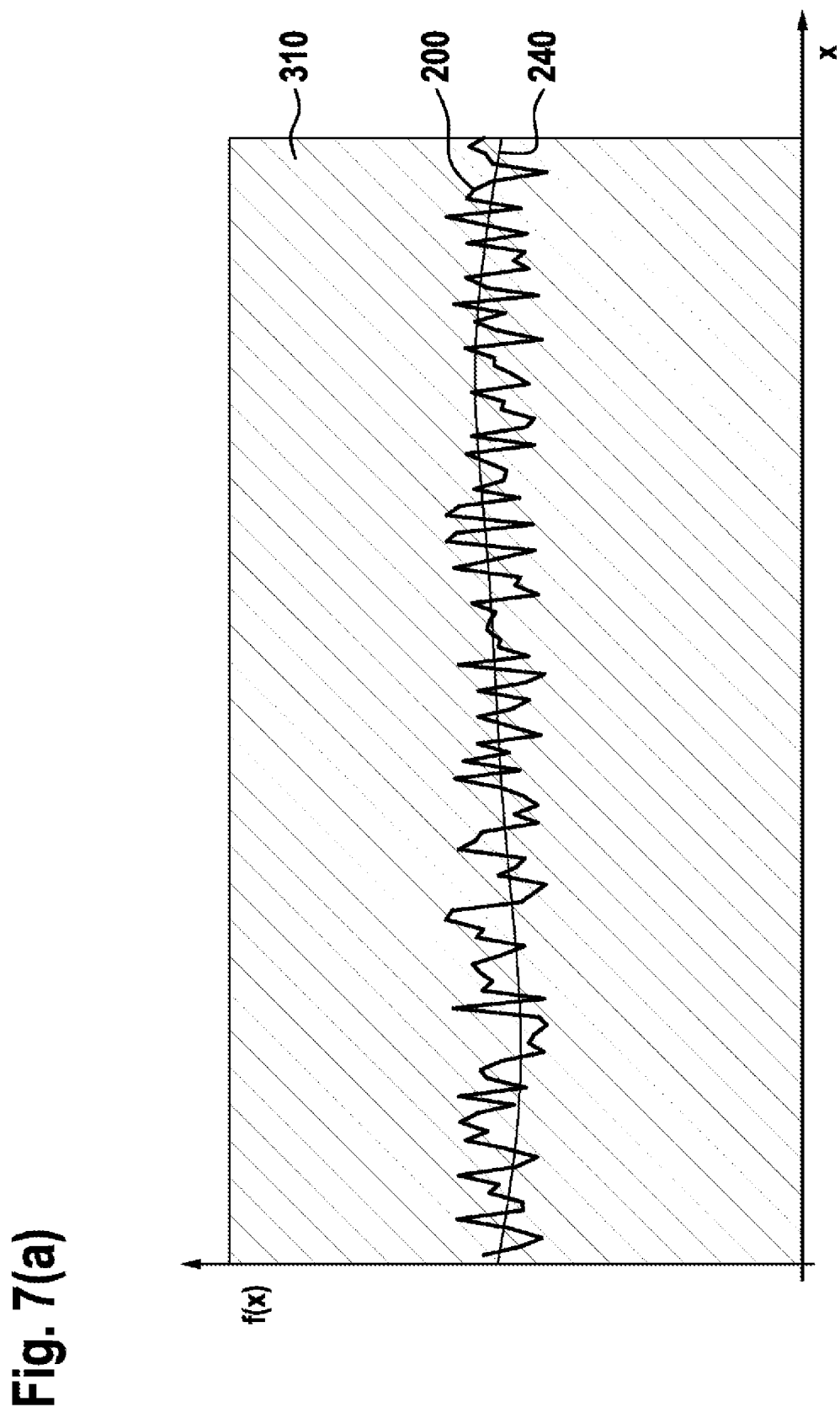

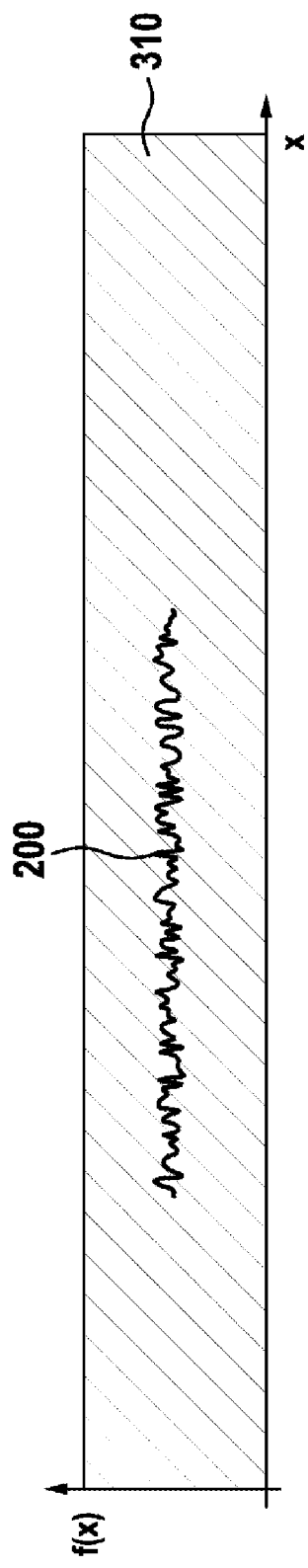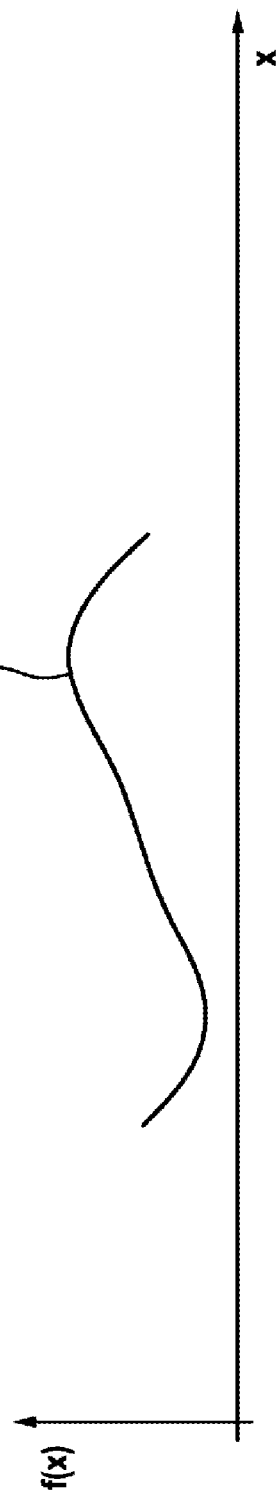
Fig. 8(a)
Fig. 8(b)

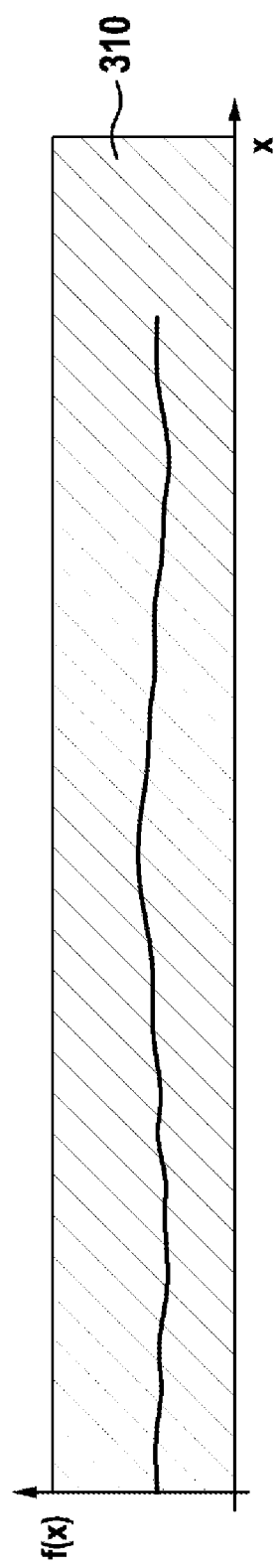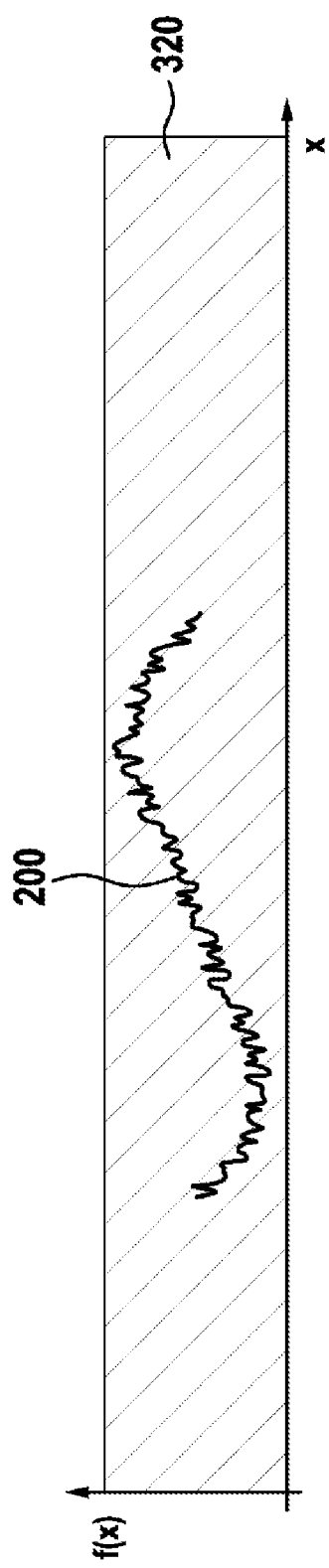

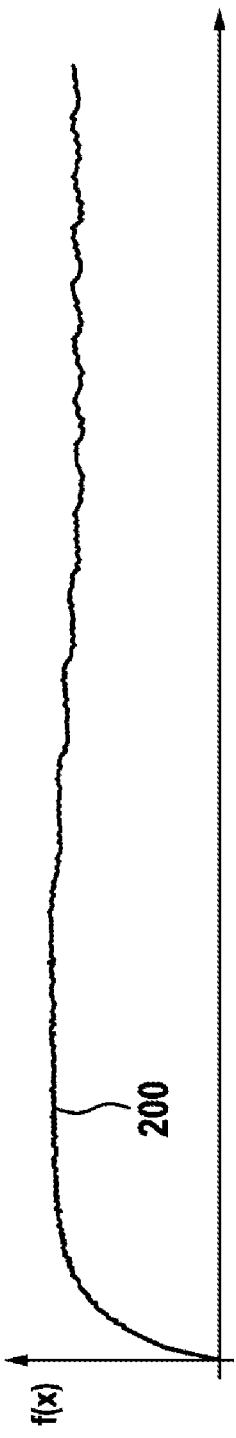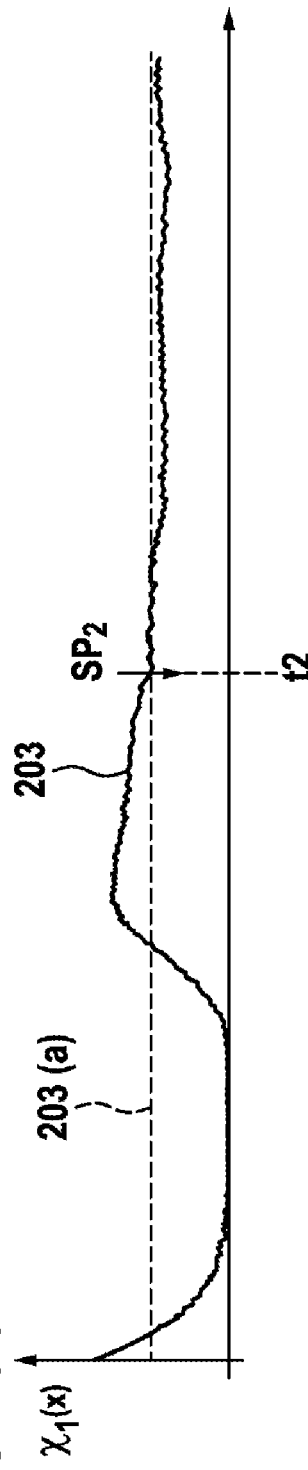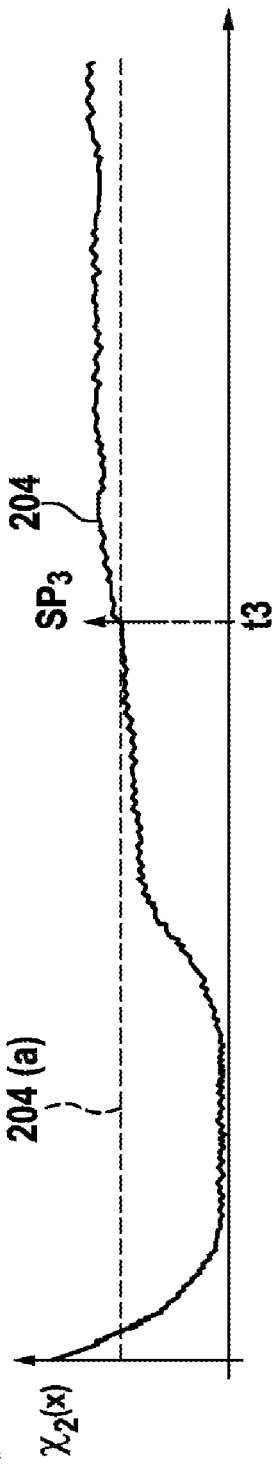

METHOD FOR DETECTING WORK PROGRESS OF A HANDHELD POWER TOOL

This application is a 35 U.S.C. § 371 National Stage Application of PCT/EP2020/069291, filed on Jul. 8, 2020, which claims the benefit of priority to Serial No. DE 10 2019 211 303.6, filed on Jul. 30, 2019 in Germany, the disclosures of which are incorporated herein by reference in their entirety.

The disclosure relates to a method for detecting work progress of a handheld power tool and to a handheld power tool configured to perform the method.

BACKGROUND

Rotary impact drivers for tightening threaded elements such as, for example, threaded nuts and screws are known from the prior art (see, for example, EP 3 381 615 A1). A rotary impact driver of this type comprises, for example, a design in which an impact force in a rotational direction is imparted to a threaded element by a rotary impact force of a hammer. The rotary impact driver which has this design comprises a motor, a hammer which can be driven by the motor, an anvil which is struck by the hammer, and a tool. In the case of the rotary impact driver, the motor installed in a housing is driven, the hammer being driven by the motor, the anvil is in turn struck by the rotating hammer, and an impact force is output to the tool, it being possible to distinguish two different operating modes, namely "no-impact mode" and "impact mode".

A rotary impact driver with a motor, with a hammer, and a rotational speed measuring unit, wherein the hammer is driven by the motor, is also known from EP 2 599 589 B1.

When using rotary impact drivers, it is desirable to be able to ascertain inside the power tool the work progress and hence to trigger specific desired reactions or routines of the device, for example switching off the motor, changing the engine speed, or triggering a notification to the user.

Knowing the operating state present at that moment is, inter alia, a requirement for providing such intelligent tool functions. It is identified in the prior art, for example, by monitoring the operating variables of the electric motor such as, for example, the speed and the electric current of the motor. The operating variables are here analyzed as to whether specific limit values and/or threshold values have been reached. Corresponding evaluation methods operate with absolute threshold values and/or signal gradients.

A disadvantage here is that a fixed limit value and/or threshold value can in practise be set perfectly only for one use case. As soon as the use case changes, the associated current or speed values, or their progressions over time, also change and impact detection with the aid of the set limit value and/or threshold value, or their progressions over time, no longer functions.

It can thus occur that, for example, an automatic switch-off based on detecting the impact mode reliably occurs in individual use cases when using self-tapping screws in different speed ranges, but does not occur in other use cases when using self-tapping screws.

In other methods for determining operating modes in rotary impact drivers, additional sensors, such as acceleration sensors, are used in order to extrapolate from oscillation states of the tool to the operating mode that is present at that moment.

Disadvantages of these methods are additional expenditure for the sensors and a loss of robustness of the handheld power tool because the number of installed components and electrical connections is increased compared with handheld power tools without this sensor system.

Moreover, a simple piece of information as to whether the impact mechanism is working or not is often not sufficient to be able to ascertain the work progress accurately. Thus, for example, when specific hollow screws are screwed in, the rotary impact mechanism starts very early whilst the screw is not yet completely screwed into the material but the required torque already exceeds the so-called disengagement torque of the impact mechanism. A reaction solely on the basis of the operating state (impact mode and no-impact mode) of the rotary impact mechanism is therefore not sufficient for correct automatic system functioning of the tool such as, for example, switching off.

In principle, the problem exists that the work progress needs to be ascertained also in the case of other handheld power tools such as, for example, impact power drills such that the disclosure is not limited to rotary impact drivers.

SUMMARY

The object of the disclosure is to provide a method which is improved compared with the prior art for detecting the work progress or the status of an application which at least partially overcomes the abovementioned disadvantages, or to provide at least an alternative to the prior art. A further object is to provide a corresponding handheld power tool.

These objects are achieved by means of the respective subject of the disclosure. Advantageous embodiments of the disclosure are the subject of respective embodiments.

According to the disclosure, a method for detecting work progress of a handheld power tool is disclosed, wherein the handheld power tool has an electric motor. The method here comprises the following steps:

S1 providing at least one model signal form, wherein the model signal form can be assigned to the work progress of the handheld power tool;

S2 calculating a signal of an operating variable of the electric motor;

S3 comparing the signal of the operating variable with the model signal form and calculating a conformity evaluation from the comparison;

S4 detecting the work progress at least partially with the aid of the conformity evaluation calculated in method step S3.

In this way, simple and reliable monitoring and control for the purpose of detecting the work progress can take place, wherein different operating variables can be considered in principle as operating variables which are recorded via an appropriate detector. It is particularly advantageous here that no additional sensor is required in this regard because various sensors such as, for example, for monitoring the speed, preferably Hall effect sensors, are already installed in electric motors.

In a preferred embodiment, the model signal form is a state-specific model signal form which is state-specific for specified work progress of the handheld power tool, for example a screw head bearing on a fastening base, or a loosened screw rotating freely.

The approach of detecting the work progress via operating variables in the measurement variables inside the tool such as, for example, the speed of the electric motor has proved to be particularly advantageous because using this method the work progress is detected particularly reliably and largely independently of the general operating state of the tool or its use case.

In particular additional sensor units for measuring the measurement variables inside the tool are essentially omitted here, such as, for example, an acceleration sensor unit, such that essentially only the method according to the disclosure serves to detect the work progress.

The model signal form is preferably a waveform about a mean value, in particular an essentially trigonometric waveform. The model signal form here preferably represents an ideal impact mode of the hammer on the anvil of the rotary impact mechanism, wherein the ideal impact mode is preferably impact with no further rotation of the tool spindle of the handheld power tool.

The operating variable is advantageously a speed of the electric motor or an operating variable correlating with the speed. A direct dependency of the motor speed on the impact frequency results, for example, from the fixed transmission ratio of the electric motor to the impact mechanism. The motor current is a further conceivable operating variable correlating with the speed. A motor voltage, a Hall effect signal of the motor, a battery current, or a battery voltage are also conceivable as an operating variable of the electric motor, wherein acceleration of the electric motor, acceleration of a tool holder, or a noise signal of an impact mechanism of the handheld power tool are also conceivable as the operating variable.

Calculating the conformity evaluation in method step S3 preferably comprises comparing the conformity between the signal of the operating variable and the model signal form with at least one threshold value of the conformity.

In an alternative embodiment of the disclosure, step S3 comprises comparing the signal of the operating variable with the model signal form and calculating a deviation from the comparison.

In a preferred embodiment, the threshold value of the conformity can be set by a user of the handheld power tool, and in further embodiments, the threshold value of the conformity is predefined at the factory.

In a particularly preferred embodiment, the threshold value of the conformity can be selected by the user on the basis of a predefined preselection at the factory of use cases of the handheld power tool. This can happen, for example, via a user interface such as an HMI (human-machine interface) for example a mobile device, in particular a smartphone and/or a tablet.

In particular, in method step S1 the model signal form can be set variably, in particular by a user. The model signal form is here assigned to the work progress to be detected such that the user can predetermine the work progress to be detected. In this context, a limit and/or threshold value for the conformity or error that exists between the signal of the operating variable and the model signal form can represent an adjustable variable for use cases for detecting the work progress.

The method moreover advantageously comprises a method step S5 of triggering a routine of the handheld power tool at least partially on the basis of the work progress detected in method step S4. It should in principle be noted here that method step S5 can take place after S4.

In a preferred embodiment, in method step S5 at least one or more of the reactions or routines of the group comprising changing the speed of the electric motor, reversing the direction of rotation of the electric motor, and/or optical, acoustic, and haptic feedback to a user can be performed.

The model signal form is advantageously predefined in method step S1, in particular is set at the factory. It is in principle conceivable that the model signal form is saved or stored inside the device, is provided alternatively and/or additionally to the handheld power tool, in particular is provided by an external data device.

In a further embodiment, the signal of the operating variable is recorded in method step S2 as the progression over time of measured values of the operating variable or as measured values of the operating variable as a variable of the electric motor correlating with the progression over time, for example acceleration, a jerk, in particular of a higher order, an output, an energy, an angle of rotation of the electric motor, an angle of rotation of the tool holder, or a frequency.

In the last-mentioned embodiment, it can be ensured that a consistent periodicity of the signal to be analyzed results independently of the motor speed.

Alternatively, the signal of the operating variable is recorded in method step S2 as the progression over time of measured values of the operating variable, wherein, in a step S2a following the method step S2, on the basis of a fixed transmission ratio of the gear, the progression over time of the measured values of the operating variable is transformed into a progression of the measured values of the operating variable as a variable of the electric motor correlating with the progression over time. The same advantages thus again result as in directly recording the signal of the operating variable over time.

The method according to the disclosure thus makes it possible to detect the work progress independently of at least a target speed of the electric motor, at least a start-up characteristic of the electric motor and/or at least a charging state of an energy supply, in particular a storage battery, of the handheld power tool.

The signal of the operating variable is to be understood here as a time sequence of measured values. Alternatively and/or additionally, the signal of the operating variable can also be a frequency spectrum. Alternatively and/or additionally, the signal of the operating variable can also be processed, for example smoothed, filtered, fitted, or the like.

In a further embodiment, the signal of the operating variable is stored as a sequence of measured values in a memory, preferably a ring memory, in particular of the handheld power tool.

In a particularly advantageous embodiment, in method step S3 the signal of the operating variable is compared by means of one of the comparison methods comprising at least one frequency-based comparison method and/or one comparative comparison method, wherein the comparison method compares the signal of the operating variable with the model signal form as to whether at least one predetermined threshold value has been met. The predetermined threshold value can here be determined at the factory or can be set by a user.

At least partially by means of the frequency-based comparison method, in particular band-pass filtering and/or frequency analysis, the decision can here be made as to whether work progress to be detected has been identified in the signal of the operating variable.

In one embodiment, the frequency-based comparison method comprises at least band-pass filtering and/or frequency analysis, wherein the predetermined threshold value is at least 90%, in particular 95%, very particularly 98%, of a predetermined limit value.

In band-pass filtering, the recorded signal of the operating variable is, for example, filtered via a band-pass filter with a pass band which conforms with the model signal form. A corresponding amplitude in the resulting signal is to be expected when the relevant work progress to be detected exists, in particular in the ideal impact with no further rotation of the impacted element. The predetermined threshold value of the band-pass filtering can therefore be at least 90%, in particular 95%, very particularly 98%, of the corresponding amplitude in the work progress to be detected, in particular the ideal impact with no further rotation of the impacted element. The predetermined limit value can here be the corresponding amplitude in the resulting signal of an ideal working step to be detected, in particular an ideal impact with no further rotation of the impacted element.

The previously established model signal form, for example a frequency spectrum of the work progress to be detected, in particular an ideal impact with no further rotation of the impacted element, can be searched for in the recorded signals of the operating variable using the known frequency-based comparison method of frequency analysis. A corresponding amplitude of the work progress to be detected, in particular the ideal impact with no further rotation of the impacted element, is to be expected in the recorded signals of the operating variable. The predetermined threshold value of the frequency analysis can be at least 90%, in particular 95%, very particularly 98%, of the corresponding amplitude in the work progress to be detected, in particular the ideal impact with no further rotation of the impacted element. The predetermined limit value can here be the corresponding amplitude in the recorded signals of ideal work progress to be detected, in particular the ideal impact with no further rotation of the impacted element. Appropriate segmentation of the recorded signal of the operating variable can be necessary here.

In one embodiment, the comparative comparison method comprises at least parameter estimation and/or cross-correlation, wherein the predetermined threshold value is at least 40% conformity of the signal of the operating variable with the model signal form.

The measured signal of the operating variable can be compared with the model signal form by means of the comparative comparison method. The measured signal of the operating variable is calculated such that it has essentially the same finite signal length as that of the model signal form. The comparison of the model signal form with the measured signal of the operating variable can here be output as an in particular discrete or continuous signal of finite length. Depending on the degree of conformity or deviation from the comparison, a result can be output as to whether the work progress to be detected, in particular the ideal impact with no further rotation of the impacted element, is present. If the measured signal of the operating variable conforms by at least 40% with the model signal form, the work progress to be detected, in particular the ideal impact with no further rotation of the impacted element, can exist. It is additionally conceivable that the comparative method can, by means of comparing the measured signal of the operating variable with the model signal form, output a degree of comparison with each other as the result of the comparison. A comparison of at least 60% with each other can here be a criterion for the existence of the work progress to be detected, in particular the ideal impact with no further rotation of the impacted element. It can be assumed here that the lower limit for conformity is 40% and the upper limit for conformity is 90%. Accordingly, the upper limit for the deviation is 60% and the lower limit for the deviation is 10%.

A comparison between the previously established model signal form and the signal of the operating variable can be made simply in the case of parameter estimation. To do this, estimated parameters of the model signal form can be identified in order to align the model signal form to the measured signal of the operating variables. A result concerning the existence of the work progress to be detected, in particular the ideal impact with no further rotation of the impacted element, can be calculated by means of a comparison between the estimated parameters of the previously established model signal form and a limit value. The result of the comparison can then be further evaluated as to whether the predetermined threshold value has been reached. This evaluation can be either determining the quality of the estimated parameters or the conformity between the established model signal form and the measured signal of the operating variable.

In a further embodiment, the method step S3 contains a step S3a of determining the quality of the identification of the model signal form in the signal of the operating variable, wherein, in method step S4, the decision as to whether the work progress to be detected exists is made at least partially with the aid of the quality determination. The quality of the match with the estimated parameters can be calculated as a measure of the quality determination.

In method step S4, the decision as to whether the work progress to be detected has been identified in the signal of the operating variable can be made at least partially by means of the quality determination, in particular the measure of the quality.

In addition or as an alternative to the quality determination, method step S3a can comprise determining the conformity of the identification of the model signal form and the signal of the operating variable. The conformity of the estimated parameters of the model signal form to the measured signal of the operating variable can be, for example, 70%, in particular 60%, very particularly 50%. The decision is made in method step S4 as to whether the work progress to be detected exists, at least partially with the aid of the conformity determination. The decision that the work progress to be detected exists can be made at the predetermined threshold value of at least 40% conformity of the measured signal of the operating variable and the model signal form.

In the case of a cross-correlation, a comparison between the previously established model signal form and the measured signal of the operating variable can be made. In the cross-correlation, the previously established model signal form can be correlated with the measured signal of the operating variable. A measure of the conformity of the two signals can be calculated when correlating the model signal form with the measured signal of the operating variable. The measure of the conformity can be, for example, 40%, in particular 50%, very particularly 60%.

In method step S4 of the method according to the disclosure, the decision as to whether the work progress to be detected exists can be made at least partially with the aid of the cross-correlation of the model signal form with the measured signal of the operating variable. The decision can be made at least partially with the aid of the predetermined threshold value of at least 40% conformity of the measured signal of the operating variable and the model signal form.

In a method step, the work progress to be detected is identified with the aid of less than ten impacts of an impact mechanism of the handheld power tool, in particular less than ten impact oscillation periods of the electric motor, preferably less than six impacts of an impact mechanism of the handheld power tool, in particular less than six impact oscillation periods of the electric motor, very preferably less than four impacts of an impact mechanism, in particular less than four impact oscillation periods of the electric motor. An impact of the impact mechanism is here to be understood as an axial, radial, tangential, and/or circumferentially directed impact of an impact mechanism striker, in particular a hammer, on an impact mechanism body, in particular an anvil. The impact oscillation period of the electric motor is correlated with the operating variable of the electric motor. An impact oscillation period of the electric motor can be calculated with the aid of operating variable fluctuations in the signal of the operating variable.

The work progress can, for example, be identified by a reduction in the angle by which the tool holder further rotates when impacted by the impact mechanism. The angle of further rotation can here be the angle of rotation by which the tool holder is rotated per impact of the impact mechanism. Thus, when the work progress is continuing, the angle of further rotation can be smaller, which can also be reflected in a decreasing period duration.

A further subject of the disclosure is formed by a handheld power tool having an electric motor, a detector for an operating variable of the electric motor, and a control unit, wherein advantageously the handheld power tool is an impact driver, in particular a rotary impact driver, and the work progress to be detected is an impact with no further rotation of a tool holder of the handheld power tool. The electric motor here sets an input spindle in rotation, wherein an output spindle is connected to the tool holder. An anvil is connected non-rotatably to the output spindle and a hammer is connected to the input spindle in such a way that, as a consequence of the rotational movement of the input spindle, it performs an intermittent movement in the axial direction of the input spindle and an intermittent rotary movement about the input spindle, wherein the hammer in this way intermittently strikes the anvil and thus imparts an impact impulse and a rotary impulse to the anvil and hence to the output spindle. A first sensor transmits a first signal, for example for calculating motor angle of rotation, to the control unit. Moreover, a second sensor can transmit a second signal for calculating motor speed to the control unit. The control unit is advantageously designed to perform an above described method.

The handheld power tool advantageously has a memory unit in which various values can be stored.

In a further embodiment, the handheld power tool is a battery-operated handheld power tool, in particular a battery-operated rotary impact driver. Flexible and cordless use of the handheld power tool is ensured in this way.

The handheld power tool is advantageously an impact driver, in particular a rotary impact driver, and the work progress to be detected is an impact of the rotary impact mechanism with no further rotation of the impacted element or the tool holder.

The impacts of the impact mechanism of the handheld power tool, in particular the impact oscillation periods of the electric motor, can be identified, for example, by the use of a fast-fitting algorithm by means of which evaluation of the impact detection can be facilitated in less than 100 ms, in particular less than 60 ms, very particularly less than 40 ms. The said novel method here enables work progress to be detected essentially for all the abovementioned use cases and both loose and fixed fastening elements to be screwed into the fastening support.

The present disclosure makes it possible to dispense as far as possible with complex signal processing methods such as, for example, filters, signal loopbacks, system models (static and adaptive), and signal updating.

These methods furthermore enable the impact mode or the work progress to be identified even more quickly, as a result of which an even quicker reaction of the tool can be triggered. This applies in particular to the number of impacts made after the impact mechanism has started and until the identification and also in particular operating situations such as, for example, the start-up phase of the drive motor. Also, no compromises need to be made here in the functionality of the tool such as, for example, a reduction in the maximum drive speed. Furthermore, the functioning of the algorithm is also independent of further influencing variables such as, for example, target speed and battery charging level.

In principle, no additional sensor system (for example, acceleration sensors) is required but these evaluation methods can also be applied to signals of further sensor systems. Furthermore, this method can also be applied for other signals in different motor designs which, for example, do not include speed measurement.

In a preferred embodiment, the handheld power tool is a battery-powered screwdriver, a power drill, an impact power drill, or a hammer drill, wherein a drill bit, a core bit, or different bit attachments can be used as the tool. The handheld power tool according to the disclosure is designed in particular as an impact driver, wherein a relatively high peak torque for screwing in or unscrewing a screw or a threaded nut is generated by the pulsed release of the motor energy. The transmission of electrical energy is to be understood in particular in this connection to mean that the handheld power tool passes energy to the body via a storage battery and/or via a power cable attachment.

In addition, the driver can have a flexible direction of rotation depending on the embodiment chosen. In this way, the proposed method can be used to both screw in and unscrew a screw or a threaded nut.

Within the scope of the present disclosure, it is intended that "calculate" includes in particular measure or record, that "record" is understood in the sense of measure and save, and that "calculate" also includes possible signal processing of a measured signal.

Furthermore, it is intended that "decide" is also to be understood as detect, with a clear assignment being made. It is intended that "identify" is understood to mean detecting partial conformity with a template which can, for example, be enabled by fitting a signal to the template, Fourier analysis, or the like. It is intended that "partial conformity" is understood to mean that the fitting has an error which is less than a predetermined threshold, in particular is less than 30%, very particularly is less than 20%.

Further features, possible applications, and advantages of the disclosure will become apparent from the following description of the exemplary embodiment of the disclosure which is illustrated in the drawings. It should be noted here that the features described or illustrated in the drawings, individually or in any combination, have only a descriptive character with regard to the subject of the disclosure, and independently of their formulation or representation in the description or in the drawings, and it should not be thought that the disclosure is restricted in any form.

BRIEF DESCRIPTION OF THE DRAWINGS

The disclosure is explained in detail below with the aid of preferred exemplary embodiments. The drawings are schematic and in them:

FIG. 2(a) shows work progress of an exemplary application and an assigned signal of an operating variable;

FIG. 2(b) shows the conformity of the signal shown in FIG. 2(a) of the operating variable with a model signal;

FIG. 9(a) shows a signal of an operating variable;

FIG. 9(b) shows an amplitude function of a first frequency contained in the signal from FIG. 9(a);

FIG. 9(c) shows an amplitude function of a second frequency contained in the signal from FIG. 9(a).

DETAILED DESCRIPTION

Figure 1:
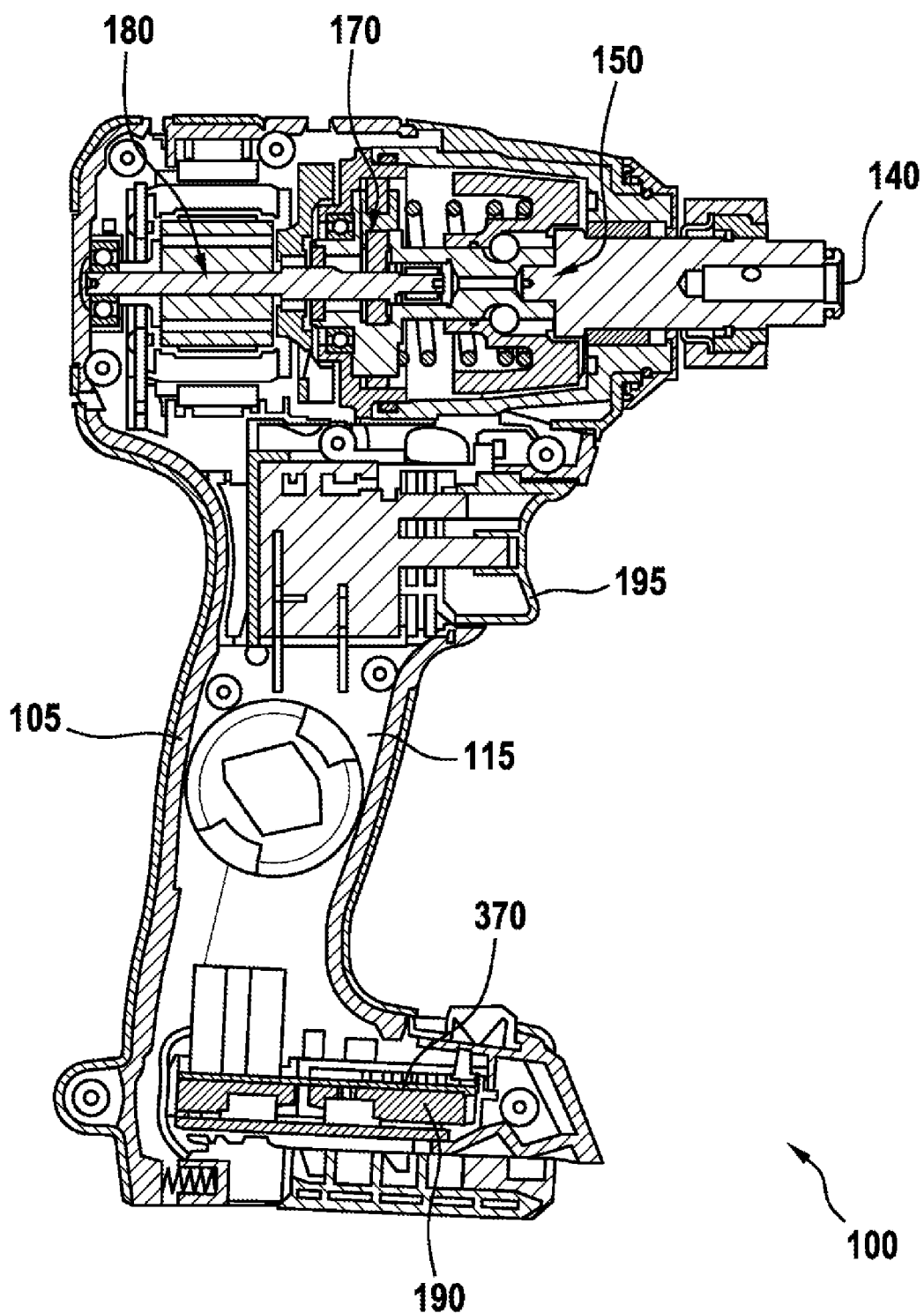
FIG. 1 shows a schematic view of an electric handheld power tool.

FIG. 1 shows a handheld power tool 100 according to the disclosure which has a housing 105 with a handle 115. According to the embodiment illustrated, the handheld power tool 100 can be connected mechanically and electrically to a storage battery pack 190 for cordless power supply. In FIG. 1, the handheld power tool 100 is designed by way of example as a battery-powered rotary impact driver. It should, however, be pointed out that the present disclosure is not limited to battery-powered rotary impact drivers and can in principle be applied in handheld power tools 100 in which it is necessary to detect work progress such as, for example, impact power drills.

An electric motor 180, which can be supplied with current from the storage battery pack 190, and a gear 170 are arranged in the housing 105. The electric motor 180 is connected to an input spindle via the gear 170. Moreover, a control unit 370, which, for the open- and/or closed-loop control of the electric motor 180 and the gear 170, for example by means of a set motor speed n, a selected rotary pulse, a desired gear ratio x, or the like, acts thereon, is arranged inside the housing 105 in the region of the storage battery pack 190.

The electric motor 180 can be activated, i.e. switched on and off, for example via a manual switch 195 and can be any type of motor, for example an electronically commutated motor or a direct current motor. The electric motor 180 can in principle be controlled electronically in an open or closed loop such that both a reverse mode and specifications regarding the desired motor speed n and the desired rotary pulse can be implemented. The functioning and structure of a suitable electric motor are sufficiently known from the prior art that a detailed description has been dispensed with in order to keep the description short.

A tool holder 140 is mounted rotatably in the housing 105 via an input spindle and an output spindle. The tool holder 140 serves to hold a tool and can be integrally formed directly on the output spindle or be connected thereto as an attachment.

The control unit 370 is connected to a power source and is designed such that it can activate the electric motor 180 electronically in an open or closed control loop by means of different current signals. The different current signals ensure different rotary pulses of the electric motor 180, wherein the current signals are passed to the electric motor 180 via a control line. The power source can take the form, for example, of a battery or, as in the exemplary embodiment illustrated, of a storage battery pack 190 or of a mains connection.

Operating elements (not illustrated in detail) can moreover be provided for setting different operating modes and/or the direction of rotation of the electric motor 180.

According to an aspect of the disclosure, a method is provided by means of which work progress, for example of the handheld power tool 100 illustrated in FIG. 1, can be ascertained in the case of an application, for example screwing-in or unscrewing. The method is essentially based on analyzing signal forms and determining a degree of conformity of these signal forms, which can correspond, for example, to an evaluation of further rotation of an element, for example a screw, driven by the handheld power tool 100.

In this respect, an exemplary signal of an operating variable 200 of an electric motor 180 of a rotary impact driver, as occurs in this or a similar form when a rotary impact driver is being used properly, is illustrated in FIG. 2. Whilst the following explanations relate to a rotary impact driver, within the scope of the disclosure they also correspondingly apply to other handheld power tools 100 such as, for example, impact power drills.

In the present example in FIG. 2, time is plotted as the operating variable on the abscissa x. In an alternative embodiment, however, a variable which is correlated with time is plotted as the operating variable, such as, for example, the angle of rotation of the tool holder 140, the angle of rotation of the electric motor 180, acceleration, a jerk, in particular of a higher order, an output, or an energy. The motor speed n present at each time point is plotted on the vertical axis f(x) in the Figure. A different operating variable correlating with the motor speed can also be chosen instead of the motor speed. In alternative embodiments of the disclosure, f(x) represents, for example, a signal of the motor current.

Figure 4:
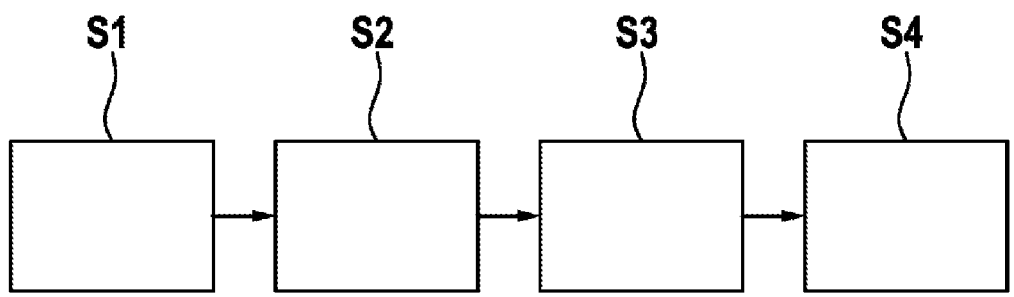
FIG. 4 shows a flow diagram of a method according to the disclosure.

The motor speed and motor current are operating variables which can usually and without additional effort be measured for handheld power tools 100 by a control unit 370. The calculation of the signal of an operating variable 200 of the electric motor 180 is characterized as method step S2 in FIG. 4, which shows a schematic flow diagram of a method according to the disclosure. In preferred embodiments of the disclosure, a user of the handheld power tool 100 can choose on the basis of which operating variable the method according to the disclosure should be performed.

A use case of a loose fastening element, for example a screw 900, in a fastening support 902, for example a wooden board, is shown in FIG. 2(a). It can be seen in FIG. 2(a) that the signal comprises a first zone 310 which is characterized by monotonic growth of the motor speed, and by a zone of a relatively constant motor speed which can also be referred to as a plateau. The intersection point of the abscissa x and the vertical axis f(x) in FIG. 2 corresponds in the screw-driving process to the start-up of the rotary impact driver.

In the first zone 310, the screw 900 meets relatively low resistance in the fastening support 902 and the torque required for screwing-in is less than the disengagement torque of the rotary impact mechanism. The progression of the motor speed in the first zone 310 therefore corresponds to the operating state of no-impact screwdriving.

As can be seen in FIG. 2(a), the head of the screw 900 does not bear on the fastening support 902 in the zone 322, which means that the screw 900 which is driven by the rotary impact driver is rotated further with each impact. This additional angle of rotation can decrease as the work procedure continues, which is reflected in the Figure by a decreasing period duration. Moreover, further screwing-in is also reflected by a decreasing average speed.

If the head of the screw 900 reaches the base 902, an even higher torque and hence more impact energy is required for screwing the screw in further. However, because the handheld power tool 100 no longer delivers impact energy, the screw 900 does noy rotate further or does so only by a significantly smaller angle of rotation.

The rotary impact mode performed in the second 322 and third zone 324 is characterized by an oscillating progression of the signal of the operating variable 200, wherein the form of the oscillation can be trigonometric or a different form of oscillation. In the present case, the oscillation has a progression which can be referred to as a modified trigonometric function. This characteristic form of the signal of the operating variable 200 in the impact driving mode results from the lifting and releasing of the impact mechanism striker and the system chain, inter alia of the gear 170, situated between the impact mechanism and the electric motor 180.

The qualitative signal form of the impact mode is therefore known in principle by virtue of the inherent properties of the rotary impact driver. In the method according to the disclosure of FIG. 4, starting from this insight at least a state-specific model signal form 240 is provided in a step S1, wherein the state-specific model signal form 240 is assigned to work progress, for example the head of the screw 900 bearing on the fastening support 902. In other words, the state-specific model signal form 240 for the work progress contains typical features such as the presence of a waveform, oscillation frequencies or amplitudes, or individual signal frequencies in continuous, virtually continuous, or discrete form.

In other applications, the work progress to be detected can be characterized by other signal forms than oscillations, for example by discontinuities or rates of growth in the function $f(x)$. In such cases, the state-specific model signal form is characterized by just these parameters instead of by oscillations.

In a preferred embodiment of the novel method, in method step S1 the state-specific model signal form 240 can be set by a user. The state-specific model signal form 240 can also be stored or saved inside the device. In an alternative embodiment, the state-specific model signal form can alternatively and/or additionally be provided to the handheld power tool 100, for example from an external data device.

In a method step S3 of the method according to the disclosure, the signal of the operating variable 200 of the electric motor 180 is compared with the state-specific model signal form 240. It is intended that the feature "compare" has a broad interpretation within the context of the present disclosure and within the sense of a signal analysis such that a result of the comparison can in particular also be a partial or gradual conformity of the signal of the operating variable 200 of the electric motor 180 with the state-specific model signal form 240, wherein the degree of conformity of the two signals can be calculated by different mathematical methods which will be mentioned later.

In step S3, a conformity evaluation of the signal of the operating variable 200 of the electric motor 180 with the state-specific model signal form 240 is furthermore calculated from the comparison and hence the conformity of the two signals is ascertained. The performance and sensitivity of the conformity evaluation are here parameters for detecting the work progress which can be set at the factory or by a user.

FIG. 2(b) shows the progression of a function $q(x)$ of a conformity evaluation 201 corresponding to the signal of the operating variable 200 of FIG. 2(a) which, at each point on the abscissa x, gives a value of the conformity between the signal of the operating variable 200 of the electric motor 180 and the state-specific model signal form 240.

In the present example of screwing in the screw 900, this evaluation is used to determine the measure of further rotation in the case of an impact. The state-specific model signal form 240 predetermined in step S1 corresponds in the example to an ideal impact with no further rotation, i.e. the state in which the head of the screw 900 bears on the surface of the fastening support 902, as shown in the zone 324 of FIG. 2(a). Accordingly, a high degree of conformity of the two signals results in the zone 324, which is reflected by a consistently high value of the function $q(x)$ of the conformity evaluation 201. In contrast, in the zone 310 in which each impact is accompanied by high angles of rotation of the screw 900, only low conformity values are obtained. The less the screw 900 further rotates on impact, the higher the conformity, which can be seen from the fact that the function $q(x)$ of the conformity evaluation 201 presents continuously increasing conformity values as soon as the impact mechanism enters the zone 322 which is characterized by an angle of rotation of the screw 200 which becomes continually smaller per impact because of the increasing resistance to screwing-in.

In a method step S4 of the method according to the disclosure, the work progress is then detected at least partially with the aid of the conformity evaluation 201 calculated in method step S3. As can be seen in the example in FIG. 2, the conformity evaluation 201 of the signals is well suited to distinguishing signals because of its more or less sudden manifestation, wherein this sudden change is caused by the likewise more or less sudden change in the angle of further rotation of the screw 900 when the exemplary working procedure concludes. The work progress can here be detected, for example, at least partially with the aid of a comparison of the conformity evaluation 201 with a threshold value which is indicated in FIG. 2(b) by a dashed line 202. In the present example in FIG. 2(b), the intersection point SP of the function $q(x)$ of the conformity evaluation 201 with the line 202 is assigned to the work progress of the head of the screw 900 bearing on the surface of the fastening support 902.

The criterion derived therefrom and with the aid of which the work progress is determined can here be set in order to make the function usable for a very wide range of use cases. It should be noted here that the function is not only limited to cases of screwing-in but also includes use in unscrewing applications.

According to the disclosure, an evaluation of the further rotation of an element driven by a rotary impact driver can therefore be undertaken by distinguishing between signal forms in order to establish the work progress of an application. According to a preferred embodiment of the disclosure, in a method step S5 an application-oriented suitable reaction or routine of the tool is performed at least partially on the basis of the work progress, for example switching off the power tool, changing the speed of the electric motor 180, and/or optical, acoustic, and/or haptic feedback to the user of the handheld power tool 100.

In practical applications, it can be provided that the method steps S2 and S3 are performed repetitively during the operation of a handheld power tool 100 in order to monitor the work progress of the application performed. For this purpose, segmentation of the calculated signal of the operating variable 200 can take place in method step S2 such that the method steps S2 and S3 are carried out on signal segments, preferably always of the same fixed length.

For this purpose, the signal of the operating variable 200 can be saved as a series of measured values in a memory, preferably a ring memory. In this embodiment, the handheld power tool 100 comprises the memory, preferably the ring memory.

As already mentioned in connection with FIG. 2, in preferred embodiments of the disclosure, in method step S2 the signal of the operating variable 200 is calculated as the progression over time of measured values of the operating variable, or as measured values of the operating variable as a variable of the electric motor 180 which correlates with the progression over time. The measured values can here be discrete, virtually continuous, or continuous.

An embodiment provides here that the signal of the operating variable 200 is recorded in method step S2 as the progression over time of measured values of the operating variable and, in a method step S2a following method step S2, the progression over time of the measured values of the operating variable is transformed into a progression of the measured values of the operating variable as a variable of the electric motor 180 which correlates with the progression over time, such as, for example, the angle of rotation of the tool holder 140, the motor angle of rotation, acceleration, a jerk, in particular of a higher order, an output, or an energy.

Figure 3A:
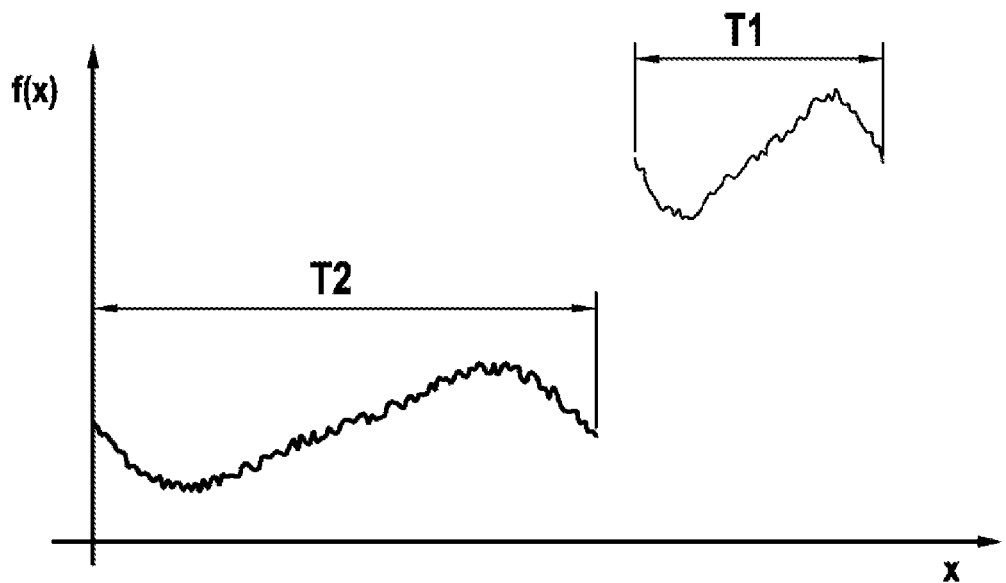
FIG. 3 shows a schematic view of two different recordings of the signal of the operating variable.

The advantages of this embodiment are described below with the aid of FIG. 3. Similarly to FIG. 2, FIG. 3a shows signals f(x) of an operating variable 200 over an abscissa x, in this case over time t. As in FIG. 2, the operating variable can be a motor speed or a parameter which correlates with the motor speed.

The drawing contains two signal progressions for the operating variable 200 which can each be assigned to work progress, i.e. in the case of a rotary impact driver to, for example, the rotary impact driving mode. In both cases, the signal comprises a wavelength of a waveform which is ideally assumed to be a sine wave, wherein the signal with a shorter wavelength T1 has a progression with a higher impact frequency, and the signal with a longer wavelength T2 has a progression with a lower impact frequency.

Both signals can be generated with the same handheld power tool 100 at different motor speeds and are, inter alia, dependent on what speed of rotation the user requests via the operating switch of the handheld power tool 100.

If it is then intended that the "wavelength" parameter is used to define the state-specific model signal form 240, in the present case at least two different wavelengths T1 and T2 would have to be stored as possible parts of the state-specific model signal form so that the comparison of the signal of the operating variable 200 with the state-specific model signal form 240 in both cases yields the result "conformity". Because the motor speed can change over time generally and on a large scale, this means that the desired wavelength also varies and consequently the methods for detecting this impact frequency would accordingly have to be set adaptively.

A large number of possible wavelengths would correspondingly rapidly increase the complexity of the method and the programming.

Figure 3B:
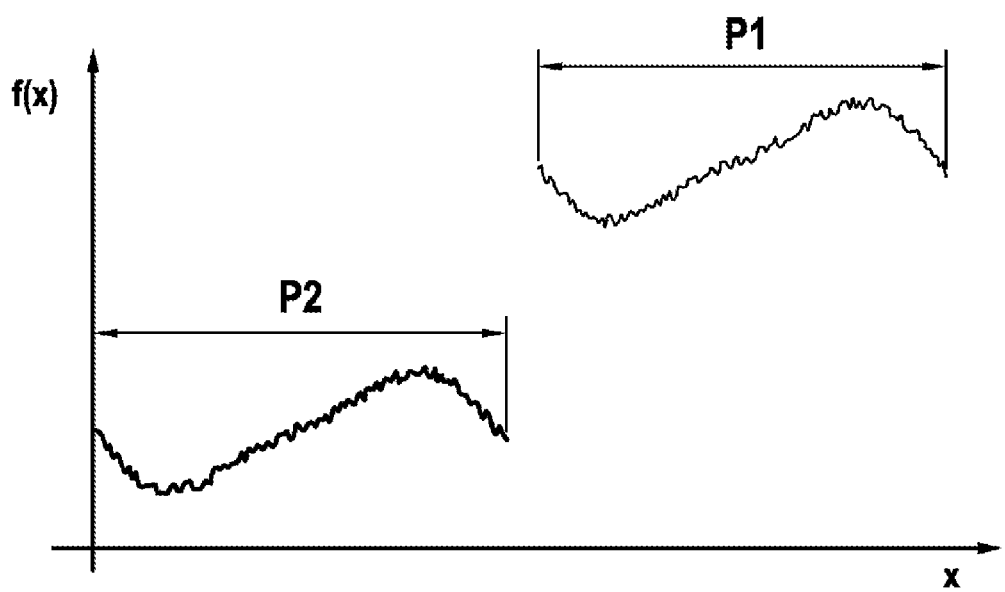

In the preferred embodiment, the time values on the abscissa are therefore transformed into values which correlate with the time values, such as, for example, acceleration values, jerk values of a higher order, output values, energy values, frequency values, angle of rotation values of the tool holder 140, or angle of rotation values of the electric motor 180. This is possible because a direct known dependency of the motor speed on the impact frequency results from the fixed transmission ratio of the electric motor 180 to the impact mechanism and to the tool holder 140. An oscillation signal, independent of the motor speed, of a consistent periodicity is obtained by this standardization, which is represented in FIG. 3b by the two signals from the transformation of the signals belonging to T1 and T2, wherein both signals then have the same wavelength P1=P2.

In this embodiment of the disclosure, the state-specific model signal form 240 can accordingly, valid for all rotational speeds, be established by a single parameter of the wavelength over the variable which correlates with time such as, for example, the angle of rotation of the tool holder 140, the motor angle of rotation, acceleration, a jerk, in particular of a higher order, an output, an energy.

In a preferred embodiment, the signal of the operating variable 200 is compared in method step S3 with a comparison method, wherein the comparison method comprises at least one frequency-based comparison method and/or one comparative comparison method. The comparison method compares the signal of the operating variable 200 with the state-specific model signal form 240 as to whether at least one predetermined threshold value has been met. The comparison method compares the measured signal of the operating variable 200 with at least one predetermined threshold value. The frequency-based comparison method comprises at least band-pass filtering and/or frequency analysis. The comparative comparison method comprises at least parameter estimation and/or cross-correlation. The frequency-based and the comparative comparison method are described in detail below.

In embodiments with band-pass filtering, the input signal which may, as described, have been transformed into a variable which correlates with time is filtered via one or more band-pass filters with pass bands which conform to one or more state-specific model signal forms. The pass band results from the state-specific model signal form 240. It is also conceivable that the pass band conforms with a frequency which is fixed in connection with the state-specific model signal form 240. In the case where amplitudes of this frequency exceed a limit value fixed beforehand, as is the case when the work progress to be detected is achieved, the comparison in method step S3 then yields the result that the signal of the operating variable 200 is identical to the state-specific model signal form 240 and that the work progress to be detected has thus been achieved. Fixing an amplitude limit value can be understood in this embodiment as the calculation of the conformity evaluation of the state-specific model signal form 240 with the signal of the operating variable 200, on the basis of which a decision is made in method step S4 as to whether the work progress to be detected exists or not.

It is intended that the embodiment is explained with the aid of FIG. 9 in which the frequency analysis is used as the frequency-based comparison method. In this case, the signal of the operating variable 200, which is illustrated in FIG. 9(a) and corresponds for example to the progression of the speed of the electric motor 180 over time, is transformed from a time zone into the frequency zone with corresponding weighting of the frequencies, based on the frequency analysis, for example a fast Fourier transform (FFT). The term "time zone" is here to be understood according to the above explanations both as "the progression of the operating variable over time" and as "the progression of the operating variable as a variable which correlates with time".

The frequency analysis in this manifestation is sufficiently well known from many technical domains as a mathematical tool for signal analysis and is used inter alia to approximate measured signals as a series expansion of weighted periodic harmonic functions of different wavelengths. In FIGS. 9(b) and 9(c), for example, weighting factors $\chi_1(x)$ and $\chi_2(x)$ as function progressions 203 and 204 over time indicate whether and to what extent the corresponding frequencies or frequency bands (which for the sake of clarity are not presented here) are present in the signal being analyzed, i.e. the progression of the operating variable 200.

With reference to the method according to the disclosure, it can therefore be established by means of frequency analysis whether and with what amplitude the frequency assigned to the state-specific model signal form 240 is present in the signal of the operating variable 200. It is, however, furthermore also possible to define frequencies where their absence is a measure of the existence of the work progress to be detected. As mentioned in connection with the band-pass filtering, a limit value of the amplitude can be fixed which is a measure of the degree of conformity of the signal of the operating variable 200 with the state-specific model signal form 240.

In the example in FIG. 9(b), for example, at time point $t_2$ (point $SP_2$), the amplitude $\chi_1(x)$ of a first frequency, typically not found in the state-specific model signal form 240, in the signal of the operating variable 200 falls below an associated limit value 203(a) which in the example is a necessary but not sufficient criterion for the presence of the work progress to be detected. At the time point $t_3$ (point $SP_3$), the amplitude $\chi_2(x)$ of a second frequency, typically found in the state-specific model signal form 240, in the signal of the operating variable 200 exceeds an associated limit value 204(a). In the associated embodiment of the disclosure, the co-existence of the amplitude functions $\chi_1(x)$ and $\chi_2(x)$ falling below and exceeding the limit values 203(a), 204(a) is the decisive criterion for the conformity evaluation of the signal of the operating variable 200 with the state-specific model signal form 240. It is accordingly established in this case in method step S4 that the work progress to be detected has been achieved.

In alternative embodiments of the disclosure, only one of these criteria is used or alternatively combinations or one or both criteria with other criteria such as, for example, the reaching of a target speed of the electric motor 180.

In embodiments in which the comparative comparison method is used, the signal of the operating variable 200 is compared with the state-specific model signal form 240 in order to discover whether the measured signal of the operating variable 200 has at least 50% conformity with the state-specific model signal form 240 and the predetermined threshold value has thus been reached. It is also conceivable that the signal of the operating variable 200 is compared with the state-specific model signal form 240 in order to calculate conformity of the two signals with each other.

In embodiments of the method according to the disclosure in which parameter estimation is used as the comparative comparison method, the measured signal of the operating variables 200 is compared with the state-specific model signal form 240, wherein estimated parameters are identified for the state-specific model signal form 240. A measure of the conformity of the measured signal of the operating variables 200 with the state-specific model signal form 240 can be calculated with the aid of the estimated parameters as to whether the work progress to be detected has been achieved. Parameter estimation is here based on regression calculus which is a mathematical optimization method known to a person skilled in the art. The mathematical optimization method allows the state-specific model signal form 240 to be aligned with a series of measurement data for the signal of the operating variable 200 with the aid of the estimated parameters. A decision can be made as to whether the work progress to be detected has been achieved depending on a measure of the conformity of the state-specific model signal form 240 parameterized by means of the estimated parameters and a limit value.

With the aid of the regression calculus of the parameter estimation comparative method, a measure of conformity of the estimated parameters of the state-specific model signal form 240 to the measured signal of the operating variable 200 can also be calculated.

In order to decide whether sufficient conformity or a sufficient quality of the state-specific model signal form 240 with the estimated parameters to the measured signal of the operating variable 200 exists, in method step S3a following method step S3, determination of conformity is performed. If 70% conformity of the state-specific model signal form 240 to the measured signal of the operating variable is calculated, the decision can be made as to whether the work progress to be detected has been identified with the aid of the signal of the operating variable and whether the work progress to be detected has been achieved.

In order to decide whether sufficient conformity of the state-specific model signal form 240 with the signal of the operating variable 200 exists, in a further embodiment, in a method step S3b following method step S3, the quality of the estimated parameters is determined. In the quality determination, values for quality between 0 and 1 are calculated, it being the case that a lower value means a higher confidence in the value of the identified parameter and hence represents higher conformity between the state-specific model signal form 240 and the signal of the operating variable 200. The decision as to whether the work progress to be detected exists is made in the preferred embodiment in method step S4 at least partially with the aid of the condition that the value for the quality is in the region of 50%.

In an embodiment of the novel method, the method of cross-correlation is used in method step S3 as the comparative comparison method. As with the above described mathematical methods, the cross-correlation method is known per se to a person skilled in the art. In the cross-correlation method, the state-specific model signal form 240 is correlated with the measured signal of the operating variable 200.

Compared with the parameter estimation method presented above, the result of cross-correlation is again a signal sequence with a summed signal length from the length of the signal of the operating variable 200 and the state-specific model signal form 240, which represents the similarity of the asynchronous input signals. The maximum value of this output sequence here represents the time point of the highest conformity of the two signals, i.e. the signal of the operating variable 200 and the state-specific model signal form 240 and is therefore also a measure of the correlation itself which in this embodiment is used in method step S4 as a decisive criterion for achieving the work progress to be detected. In the implementation in the method according to the disclosure, an essential difference from parameter estimation is that any state-specific model signal forms can be used for cross-correlation, whereas in parameter estimation the state-specific model signal form 240 must be representable by parameterizable mathematical functions.

Figure 5A:
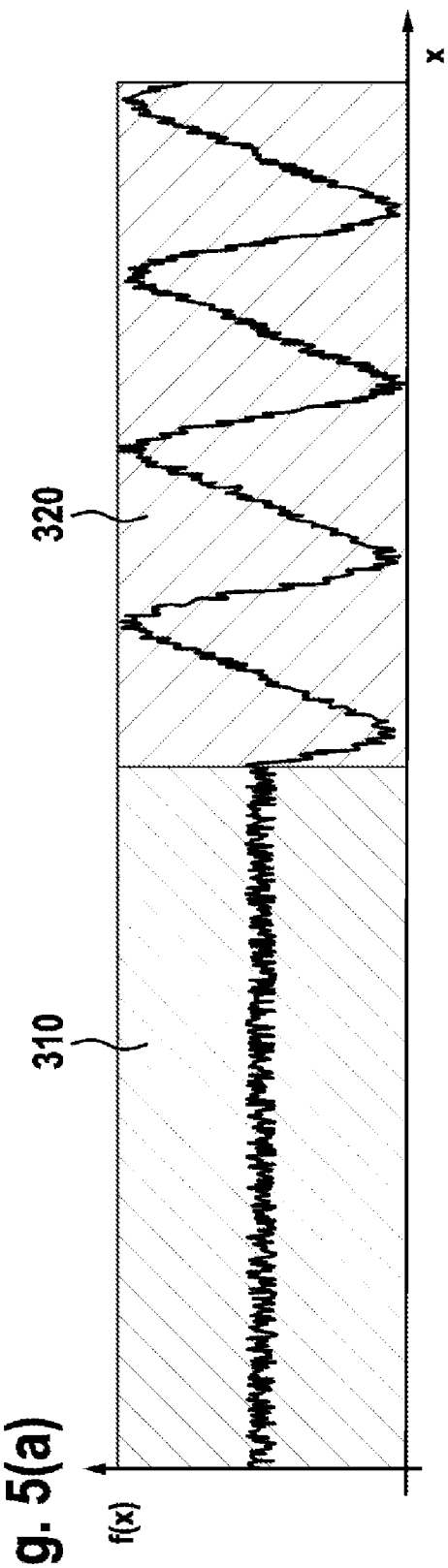
FIG. 5 shows a joint representation of a signal of an operating variable and an output signal of a band-pass filter, based on a model signal.
Figure 5B:
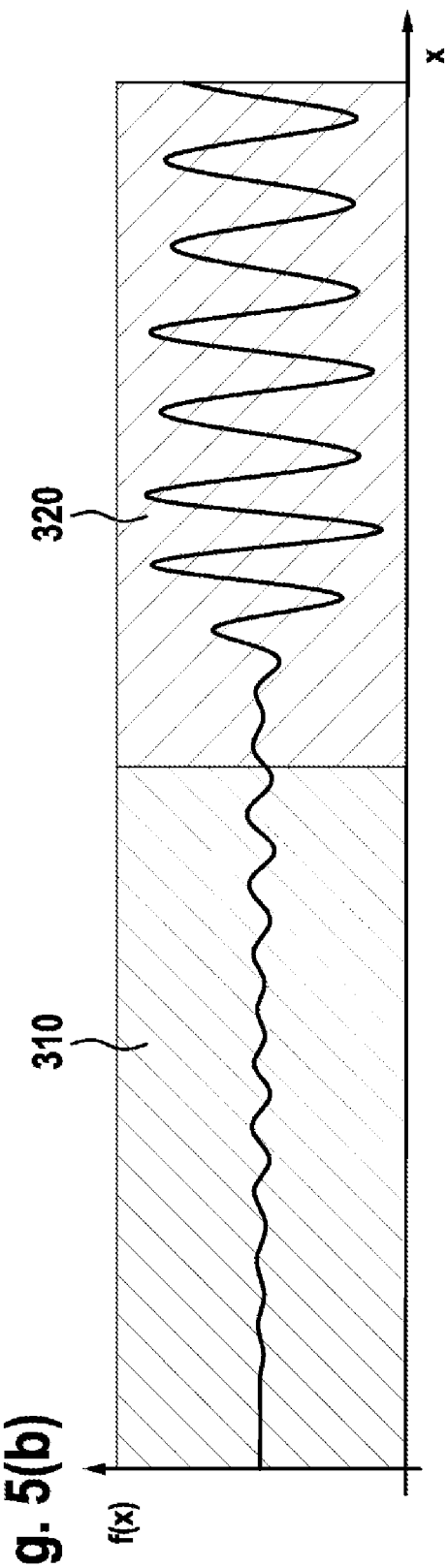
Figure 6A:
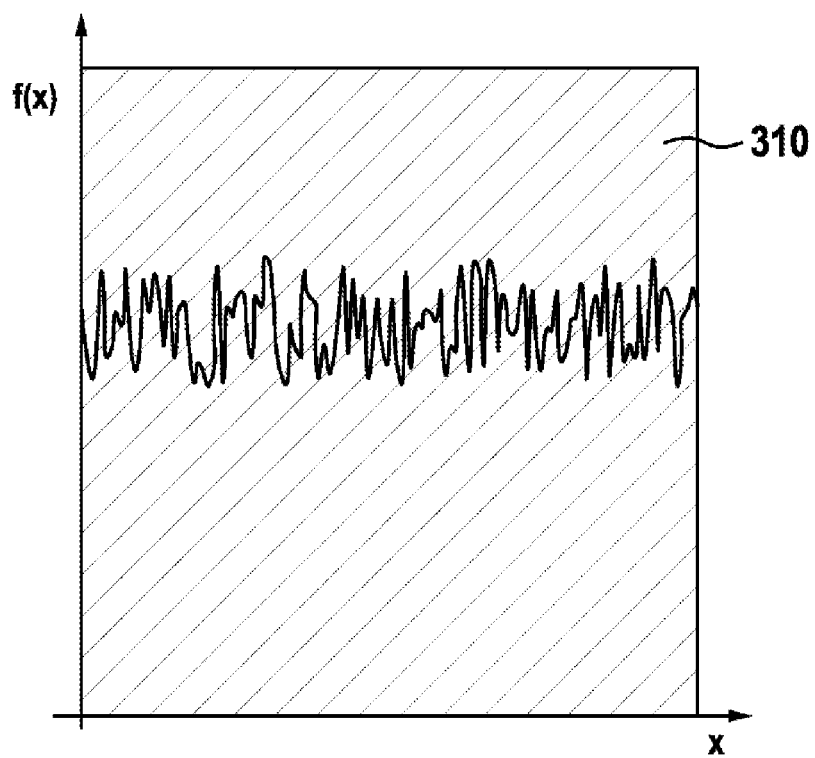
FIG. 6 shows a joint representation of a signal of an operating variable and an output of a frequency analysis, based on a model signal.
Figure 6B:
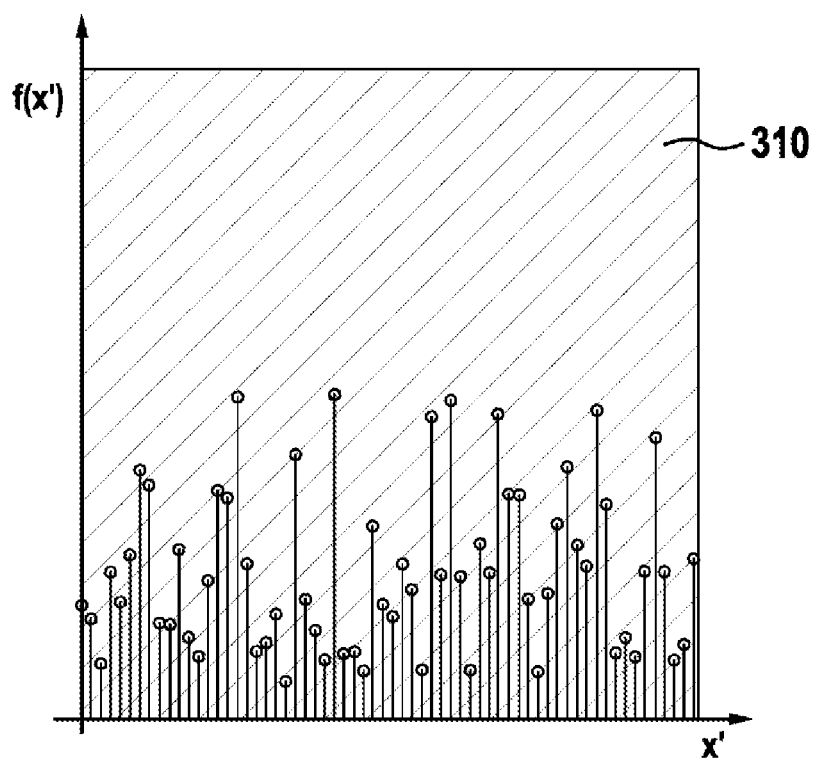
Figure 6C:
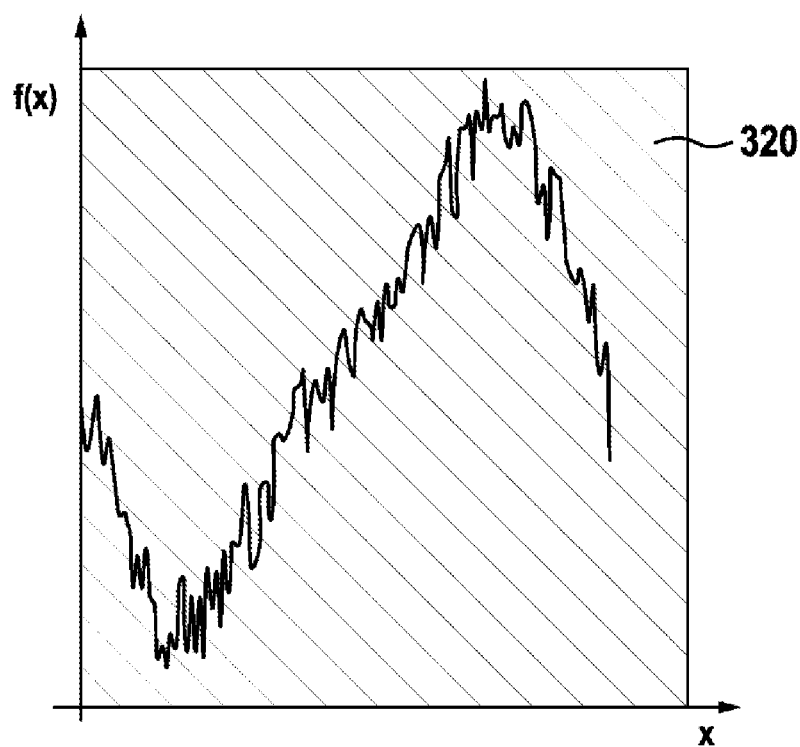
Figure 6D:
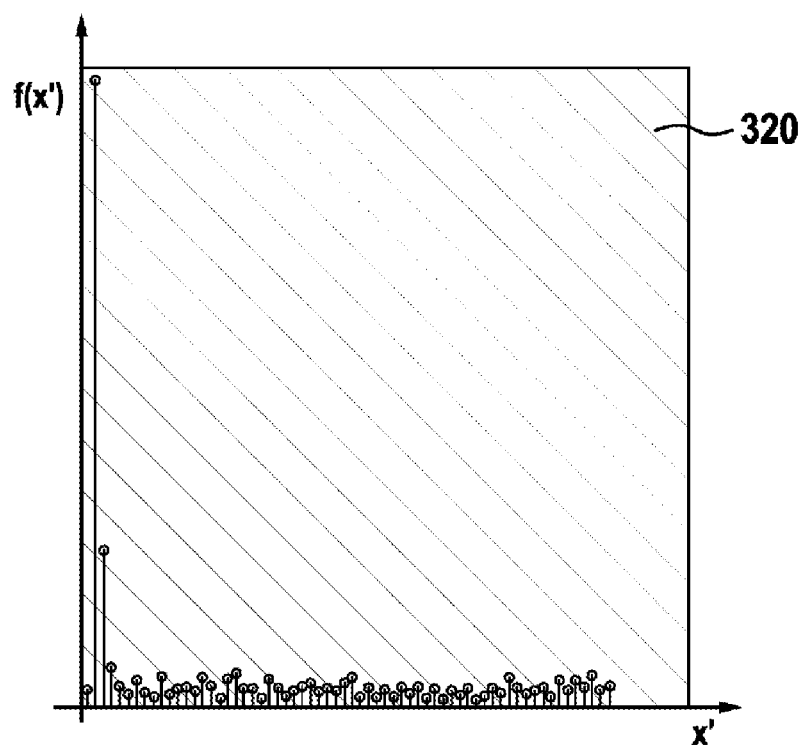

FIG. 5 shows the measured signal of the operating variable 200 for the case where band-pass filtering is used as the frequency-based comparison method. Time or a variable which correlates with time is here plotted as the abscissa x. FIG. 5a shows the measured signal of the operating variable, an input signal of the band-pass filtering, wherein the handheld power tool 100 is operated in screwdriving mode in the first zone 310. In the second zone 320, the handheld power tool 100 is operated in rotary impact mode. FIG. 5*b* illustrates the output signal after the band-pass filter has filtered the input signal.

FIG. 6 illustrates the measured signal of the operating variable 200 for the case where frequency analysis is used as the frequency-based comparison method. In FIGS. 6*a* and *b*, the first zone 310 is shown in which the handheld power tool 100 is in screwdriving mode. Time or a variable which correlates with time is here plotted on the abscissa x in FIG. 6*a*. The signal of the operating variable 200 is illustrated transformed in FIG. 6*b*, wherein it is possible to transform time into a frequency, for example by means of a fast Fourier transform. The frequency f is plotted, for example, on the abscissa x' in FIG. 6*b* such that the amplitudes of the signal of the operating variable 200 are represented. The second region 320, in which the handheld power tool 100 is in rotary impact mode, is illustrated in FIGS. 6*c* and *d*. FIG. 6*c* shows the measured signal of the operating variable 200 plotted over time in rotary impact mode. FIG. 6*d* shows the transformed signal of the operating variable 200, wherein the signal of the operating variable 200 is plotted over the frequency f as the abscissa x'. FIG. 6*d* shows characteristic amplitudes for the rotary impact mode.

FIG. 7*a* shows a typical case of comparison by means of the parameter estimation comparative comparison method between the signal of an operating variable 200 and a state-specific model signal form 240 in the first zone 310 described in FIG. 2. Whereas the state-specific model signal form 240 has an essentially trigonometric progression, the signal of the operating variable 200 has a progression which deviates significantly therefrom. Irrespective of the choice of one of the above described comparison methods, in this case the comparison performed in method step S3 between the state-specific model signal form 240 and the signal of the operating variable 200 yields the result that the degree of conformity of the two signals is low such that in method step S4 the work progress to be detected is not established.

Figure 7B:
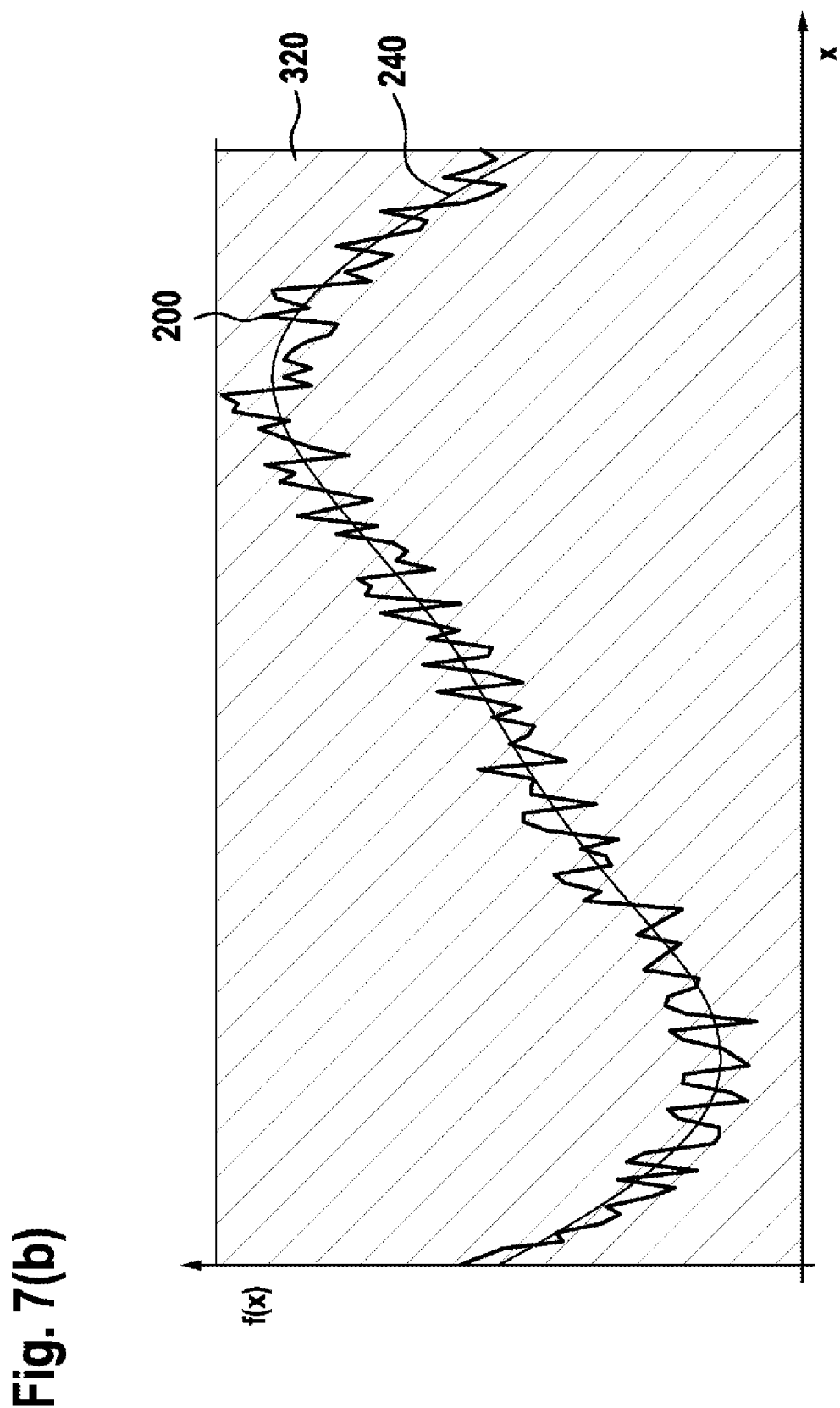
FIG. 7 shows a joint representation of a signal of an operating variable and a model signal for the parameter estimation.

In contrast, FIG. 7*b* illustrates the case in which the work progress to be detected exists and therefore the state-specific model signal form 240 and the signal of the operating variable 200 as a whole have a high degree of conformity even if deviations can be established at individual measurement points. Thus, in the parameter estimation comparative comparison method, a decision can be made as to whether the work progress to be detected has been achieved.

Figure 8E:
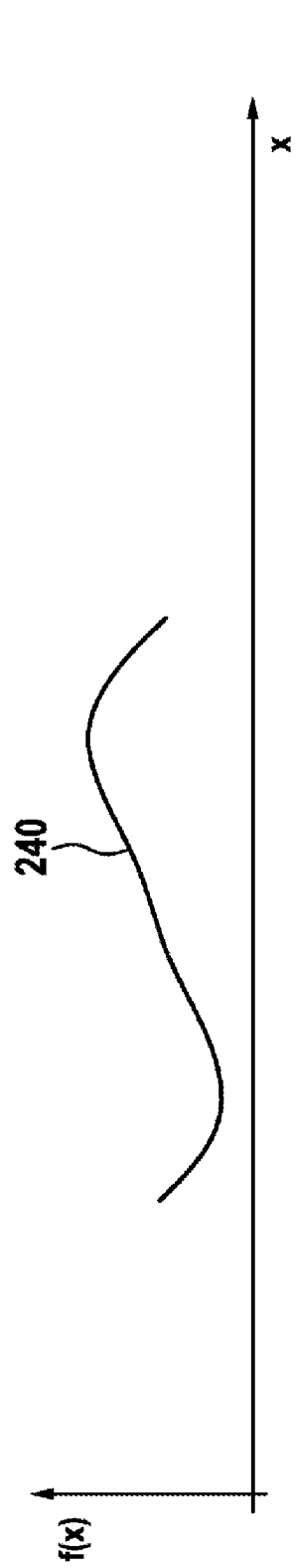
FIG. 8 shows a joint representation of a signal of an operating variable and a model signal for the cross-correlation.
Figure 8F:
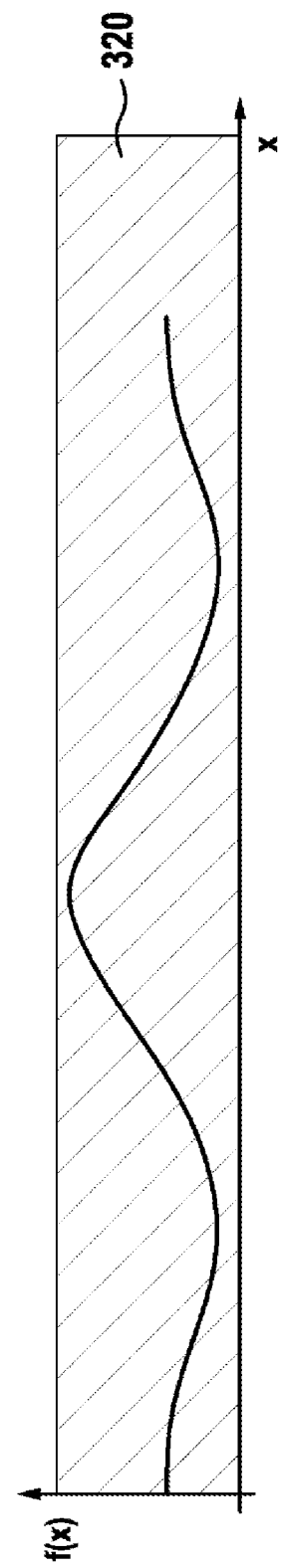

FIG. 8 shows the comparison of the state-specific model signal form 240 (see FIGS. 8*b* and *e*) with the measured signal of the operating variable 200 (see FIGS. 8*a* and 8*d*) for the case where cross-correlation is used as the comparative comparison method. Time or a variable which correlates with time is plotted on the abscissa x in FIGS. 8*a-f*. The first region 310, corresponding to the screwdriving mode, is shown in FIGS. 8*a-c*. The third region 324, corresponding to the work progress to be detected, is shown in FIGS. 8*d-f*. As described above, the measured signal of the operating variable (FIG. 8*a* and FIG. 8*d*) is correlated with the state-specific model signal form (FIGS. 8*b* and 8*e*). Respective results of the correlations are illustrated in FIGS. 8*c* and 8*f*. The result of the correlation during the first region 310 is shown in FIG. 8*c*, wherein it can be seen that a low conformity of the two signals exists. In the example in FIG. 8*c*, a decision is therefore made in method step S4 that the work progress to be detected has not been achieved. The result of the correlation during the third region 324 is shown in FIG. 8*f*. It can be seen in FIG. 8*f* that a high conformity exists such that a decision is made in method step S4 that the work progress to be detected has been achieved.

The disclosure is not limited to the exemplary embodiment described and illustrated. Instead, it also comprises all developments known to a person skilled in the art within the scope of the disclosure.

In addition to the described and illustrated embodiments, further embodiments can be envisaged which can comprise further variations or combinations of features.

The invention claimed is:

1. A method for detecting work progress of a handheld power tool having an electric motor and an impact mechanism, the method comprising:
providing at least one model signal form that is assigned to the work progress of the handheld power tool;
calculating a signal of an operating variable of the electric motor;
calculating a conformity evaluation based on a comparison of the signal of the operating variable with the at least one model signal form; and
detecting the work progress at least partially based on the conformity evaluation,
wherein the work progress includes rotating a fastener relative to a fastening support,
wherein the conformity evaluation includes calculating a plurality of conformity values each indicating a degree of conformity of the signal of the operating variable with the at least one model signal form,
wherein the conformity values above a threshold value indicate rotation of the fastener less than a predetermined angle of rotation for each impact of the impact mechanism, and
wherein the conformity values below the threshold value indicate rotation of the fastener greater than the predetermined angle of rotation for each impact of the impact mechanism.

2. The method as claimed in claim 1, wherein the at least one model signal form is a waveform.

3. The method as claimed in claim 2, wherein the at least one model signal form is a trigonometric waveform.

4. The method as claimed in claim 1, wherein the operating variable is one of (i) a speed of the electric motor and (ii) an operating variable that correlates with the speed.

5. The method as claimed in claim 1, wherein the threshold value of the conformity is set by a user of the handheld power tool.

6. The method as claimed in claim 5, wherein the threshold value of the conformity is selected by the user based on a predefined preselection of use cases of the handheld power tool.

7. The method as claimed in claim 1, the providing the at least one model signal form further comprising:
providing the at least one model signal form variably.

8. The method as claimed in claim 7, the providing at least one model signal form further comprising:
presetting the at least one model signal form variably by a user.

9. The method as claimed in claim 1 further comprising:
triggering a routine of the handheld power tool at least partially based on the detected work progress.

10. The method as claimed in claim 9, wherein the routine of the handheld power tool includes reversing a direction of rotation of the electric motor.

11. The method as claimed in claim 1, the providing at least one model signal form further comprising:
predefining the at least one model signal form.

12. The method as claimed in claim 1, the calculating the signal of the operating variable of the electric motor further comprising:
   recording the signal of the operating variable as one of (i) a progression over time of measured values of the operating variable and (ii) measured values of the operating variable over a variable of the electric motor that is correlated with the progression over time.

13. The method as claimed in claim 1, the calculating the signal of the operating variable of the electric motor further comprising:
   recording the signal of the operating variable as a progression over time of measured values of the operating variable; and
   transforming the progression over time of the measured values of the operating variable into a progression of the measured values of the operating variable over a variable of the electric motor that is correlated with the progression over time.

14. The method as claimed in claim 1, the calculating the conformity evaluation further comprising:
   comparing the signal of the operating variable by a frequency-based comparison method.

15. The method as claimed in claim 14, wherein the frequency-based comparison method includes at least one of (i) band-pass filtering and (ii) frequency analysis, a threshold value of the frequency-based comparison method being at least 90% of a predetermined limit value.

16. The method as claimed in claim 1, wherein:
   the calculating the conformity evaluation further comprises comparing the signal of the operating variable by a comparative comparison method,
   the comparative comparison method includes at least one of (i) parameter estimation and (ii) cross-correlation, and
   the threshold value of the comparative comparison method at least 40% conformity of the signal of the operating variable with the at least one model signal form.

17. The method as claimed in claim 1, wherein the work progress is detected one of (i) with aid of less than ten impacts of the impact mechanism, and (ii) with aid of less than ten impact oscillation periods of the electric motor.

18. A handheld power tool comprising:
   an electric motor;
   an impact mechanism operably connected to the electric motor;
   a detector configured to detect an operating variable of the electric motor; and
   a control unit configured to:
      provide at least one model signal form that is assigned to a work progress of the handheld power tool;
      calculate a signal of the operating variable of the electric motor;
      calculate a conformity evaluation based on a comparison of the signal of the operating variable with the at least one model signal form; and
      detect the work progress at least partially based on the conformity evaluation,
   wherein the work progress includes rotating a fastener relative to a fastening support,
   wherein the conformity evaluation includes calculating a plurality of conformity values each indicating a degree of conformity of the signal of the operating variable with the at least one model signal form,
   wherein the conformity values above a threshold value indicate rotation of the fastener less than a predetermined angle of rotation for each impact of the impact mechanism, and
   wherein the conformity values below the threshold value indicate rotation of the fastener greater than the predetermined angle of rotation for each impact of the impact mechanism.

* * * * *